Patented Nov. 6, 1951

2,574,369

UNITED STATES PATENT OFFICE 2,574,369

SOLUTION OF A POLYMER OF VINYLIDENE CYANIDE IN TETRAMETHYL UREA

Alan E. Ardis, Akron, Ohio, assignor to The B. F. Goodrich Company, New York, N. Y., a corporation of New York No Drawing. Application December 7, 1949, Serial No. 131,698

3 Claims. (Cl. 260—32.6)

This invention relates to novel and useful polymer solutions, and pertains more particularly to solutions of polymers of vinylidene cyanide in tetramethyl urea.

In U. S. Patent 2,476,270 to Alan E. Ardis, and in copending applications, Serial No. 63,434, filed December 3, 1948, now patent number 2,502,412, and Serial No. 79,712, filed March 4, 1949, now patent number 2,514,387, novel methods for the preparation of monomeric vinylidene cyanide are disclosed. In another copending application, Serial No. 11,336, filed February 26, 1948, methods for the preparation of useful polymers of vinylidene cyanide are disclosed. These polymers, especially those which possess molecular weights in excess of 25,000, are extremely valuable for the preparation of polymer solutions from which are obtained by spinning or casting synthetic filaments and films having many advantageous properties, including high tensile strength and flexibility and extreme resistance to deterioration. However, polymers of vinylidene cyanide are completely insoluble in a great number of materials, and, in fact, polyvinylidene cyanide is insoluble in almost all of the materials commonly used as polymer solvents such as ketones, esters, organic nitro compounds, hydrocarbons, thiocyanates, nitrophenols, and the like.

Accordingly, it is an object of this invention to provide a solvent in which polymers of vinylidene cyanide can be dissolved to form polymer solutions useful in the preparation of filaments, films and the like. Other objects and advantages will be apparent hereinafter.

I have now discovered that the above and other objects are readily attained by utilizing tetramethyl urea, a liquid compound having a boiling point of 171.5 to 172.5 at 736 mm., as a solvent for vinylidene cyanide polymers. In this manner it is possible to obtain polymer solutions having the properties desired in spinning and casting solutions.

Solutions of polymers of vinylidene cyanide in tetramethyl urea may be made by the methods ordinarily employed in dissolving high polymers. Thus, solution may be accomplished simply by placing the polymer, which is generally in the form of white powder of small particle size in the tetramethyl urea, and agitating the mixture until solution is complete. It is preferable, especially with high molecular weight polymers, to heat the polymer solvent mixture to a temperature of about 50° C. to 120° C. during dissolution, but this is not a critical expedient in itself, since polymers of vinylidene cyanide will dissolve in tetramethyl urea at room temperature, although a longer period of time is necessary to effect the solution. It is generally desirable that spinning and casting solutions contain from about 9 to 20 percent by weight of the polymer in order that high quality filaments and films may be obtained, and accordingly, quantities of polymer and solvent necessary to give such concentrations are ordinarily and preferably employed.

The following examples are intended to illustrate more fully the use of tetramethyl urea as a solvent for polymers of vinylidene cyanide, but are not intended to limit the scope of the invention, for it is, of course, possible to effect variations and modifications therein. In the examples all parts are by weight.

Example I 3 parts of high molecular weight polyvinylidene cyanide are added to 30 parts of tetramethyl urea. The mixture is then heated with agitation to a temperature of about 120° C. and the polymer readily dissolves to form a viscous, colorless solution which remains in a stable condition for a long period of time. The solution thus obtained is suitable for the spinning of filaments and may also be cast onto a polished surface to give useful films.

Example II

Example I is repeated except that the mixture is heated to a temperature of 70° C. to effect solution of the polymer. Although the polymer does not dissolve as rapidly as it does when heated to 120° C., the resulting solution is viscous and useful for spinning and casting.

When Example I is repeated at room temperature, the polymer dissolves slowly to form a solution having properties similar to the solutions of Examples I and II. Moreover, when the ratio of polymer to tetramethyl urea is varied within the limits hereinabove disclosed, useful solutions are likewise obtained.

In addition to being useful in the preparation of polyvinylidene cyanide solutions, tetramethyl urea may also be used to dissolve copolymers of vinylidene cyanide with other monomers copolymerizable therewith, for example, vinyl acetate, vinyl benzoate, isobutylene, styrene, vinyl chloride, vinylidene chloride, methyl methacrylate, and other vinyl and vinylidene compounds, with results substantiallly equivalent to those obtained with straight polyvinylidene cyanide.

Although the solutions of this invention remain relatively stable for long periods of time. any polymer chain degradation that may occur in the solvent may be greatly minimized by the use of a suitable solution stabilizer. Among such materials are the oxides of sulfur, and organic acid anhydrides, the use of which as stabilizers is disclosed in copending applications, Serial No. 93,816, filed May 17, 1949, and Serial No. 110,460, filed August 15, 1949.

Although specific examples of the invention have been herein described, it is not intended to limit the invention solely thereto, but to include all of the variations and modifications falling within the spirit and scope of the appended claims.

I claim:

1. A solution comprising a polymer of vinylidene cyanide dissolved in tetramethyl urea.

2. A solution comprising polyvinylidene cyanide dissolved in tetramethyl urea, said solution containing from about 9 to 20 percent by weight of polyvinylidene cyanide.

3. A solution comprising polyvinylidene cyanide of molecular weight above 25,000 dissolved in tetramethyl urea, said solution containing about 10 percent by weight of the polyvinylidene cyanide.

ALAN E. ARDIS.

REFERENCES CITED

The following references are of record in the file of this patent:

UNITED STATES PATENTS

| Number | Name | Date |
|---|---|---|
| 2,404,714 | Latham | July 23, 1946 |
| 2,460,578 | Houtz | Feb. 1, 1949 |